Dec. 22, 1959  S. G. BELEZOS  2,917,947
SPEED-VARYING APPARATUS
Filed April 2, 1957  5 Sheets-Sheet 1
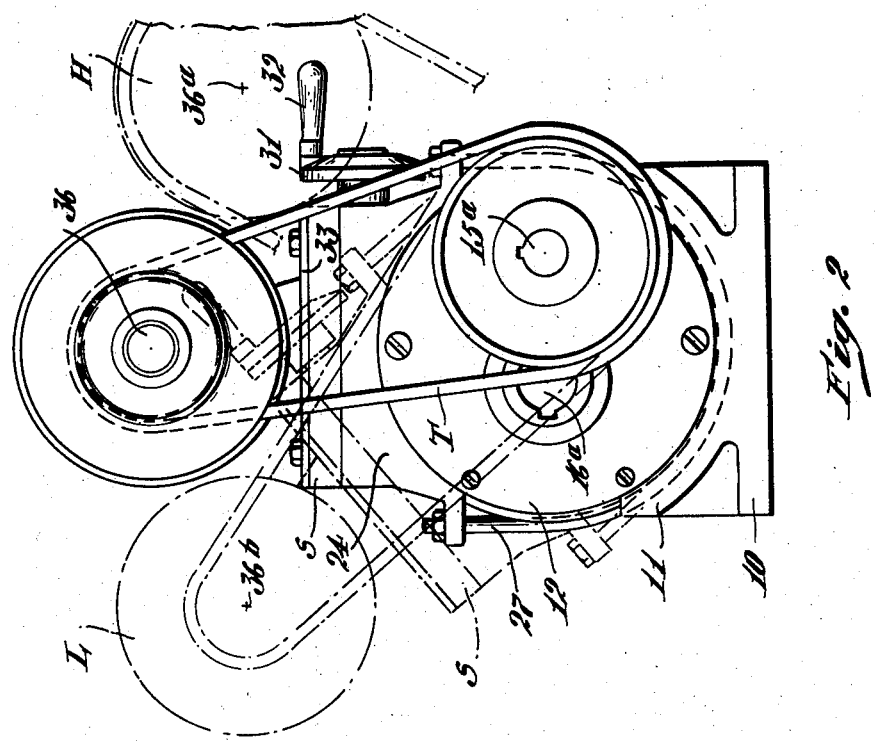
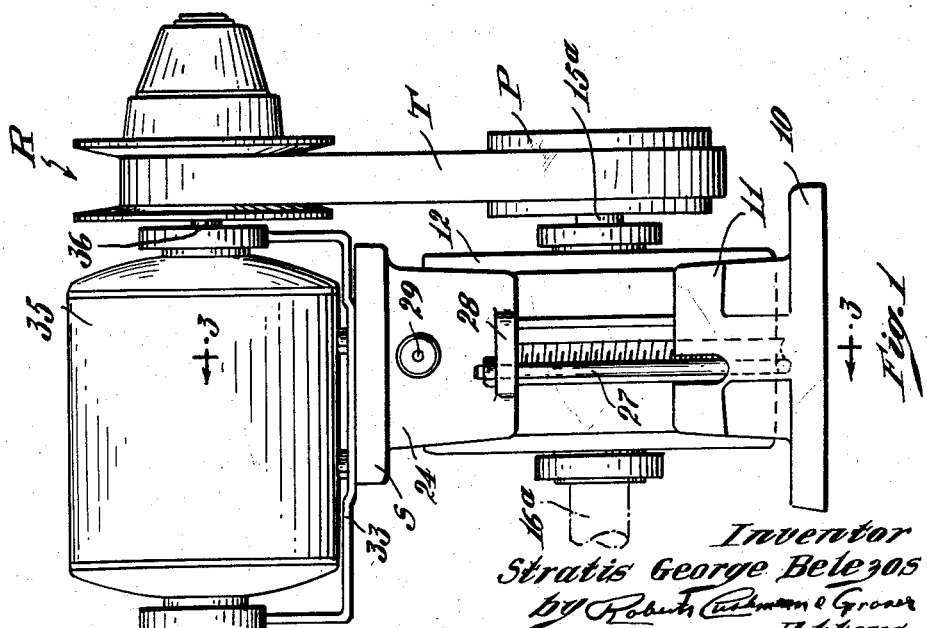
Inventor
Stratis George Belezos

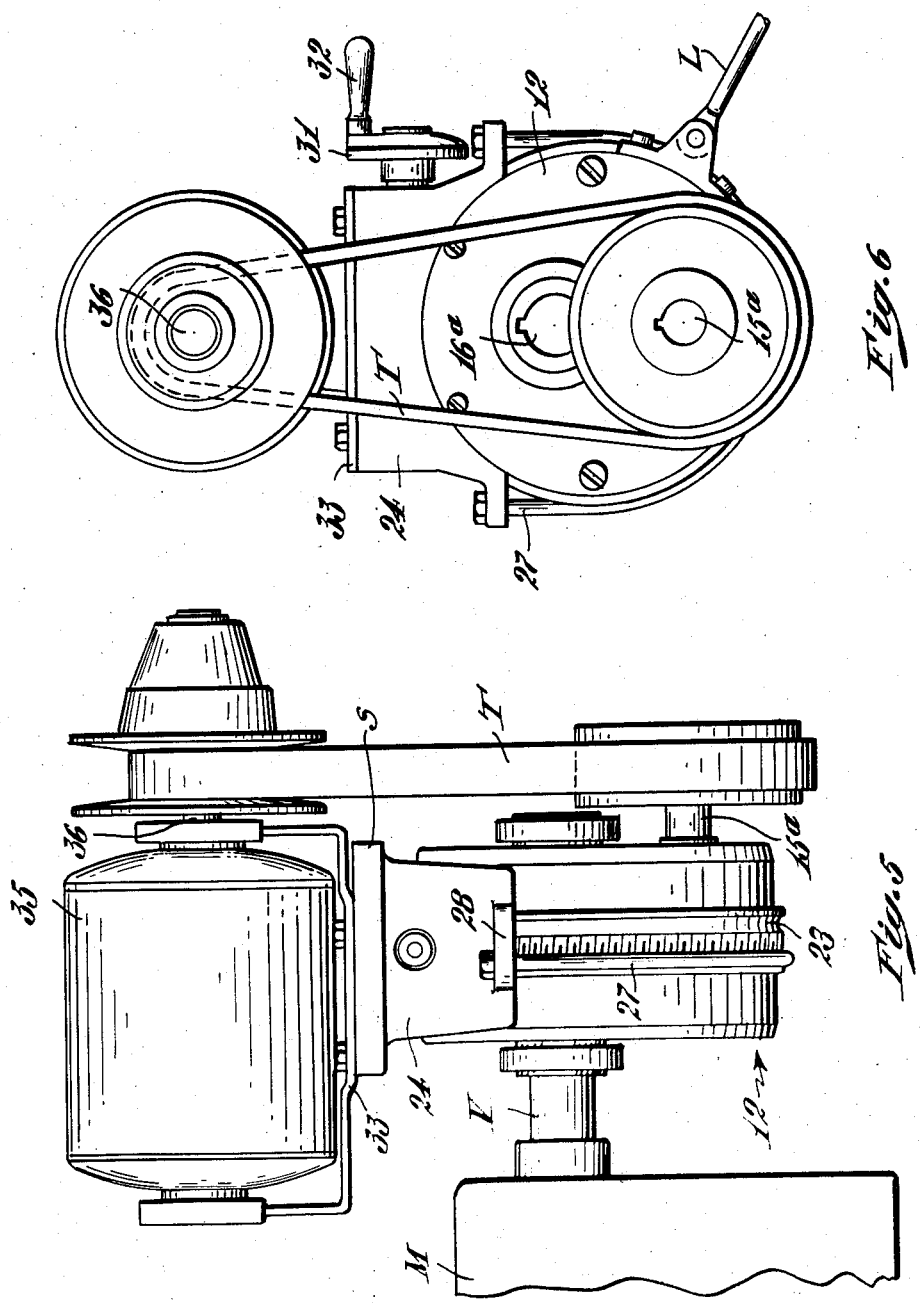

Dec. 22, 1959 S. G. BELEZOS 2,917,947
SPEED-VARYING APPARATUS
Filed April 2, 1957 5 Sheets-Sheet 4

Inventor
Stratis George Belezos

Dec. 22, 1959  S. G. BELEZOS  2,917,947
SPEED-VARYING APPARATUS
Filed April 2, 1957  5 Sheets-Sheet 5

Inventor
Stratis George Belezos
Attys

United States Patent Office
2,917,947
Patented Dec. 22, 1959

2,917,947
SPEED-VARYING APPARATUS

Stratis G. Belezos, Boston, Mass., assignor to The Murray Company of Texas, Inc., Dallas, Tex., a corporation of Delaware Application April 2, 1957, Serial No. 650,242

11 Claims. (Cl. 74—640)

This invention pertains to power transmission mechanism and, more especially, to speed-reducing or increasing means of the variable speed type. While of more general utility, the invention is here specifically described as embodied in mechanism which includes a gear transmission of the self-contained type wherein the shafts and gears which transmit motion from an intake shaft to an output shaft (whose axes are parallel) are housed within a circular casing with the axes of the input and output shafts parallel to the axis of the casing and diametrically opposite each other. A transmission unit of the general type is disclosed by way of example in Patent No. 2,813,435 which was granted to Martin T. Schumb on November 19, 1957.

The transmission unit, just above referred to, does not provide for any variation in speed but only for a predetermined speed ratio between the input and output shafts. In order to provide for a variation in speed, it has been proposed to interpose speed-varying means, for example a variable pitch-diameter motor pulley, between the power source, for example an electric motor, and the input shaft of the speed-reducing unit. In such an arrangement, the variation in speed is obtained by varying the distance between the axis of the drive motor and the axis of the input shaft. A customary way of accomplishing this is to mount the motor upon a slidable carriage. However, such an arrangement is clumsy, space-consuming and not well-adapted to situations wherein the speed-reducing unit is suspended from the shaft of the machine which is to be driven.

The present invention has for one object the provision of means for driving the input shaft of a speed-reducing or increasing unit at variable speeds and, in particular, to provide means, including a drive motor and a speed-varying unit, so devised as to occupy a minimum of space and to be applicable, for example, to appliances wherein a speed-reducing or increasing unit is mounted directly upon the shaft of the machine to be driven, although capable of being mounted on a stationary base.

In accordance with the present invention and in the attainment of the above object, advantage is taken of the fact that the casing of the speed-reducing unit, as above noted, is circular, with the axes of the input and output shafts at diametrically opposite sides of the axis of the casing, and mounting the drive motor for bodily movement in an arcuate path whose center is on the axis of the circular casing, the result being that the distance between the axis of the shaft of the drive motor and the axis of the input shaft of the speed-reducing unit varies in accordance with the position which the motor occupies in its arcuate path. It thus becomes possible, merely by swinging the motor in said arcuate path, to vary the effective distance between the axis of the motor shaft and the input shaft and, thus, if a variable pitch-diameter motor pulley or equivalent drive be interposed between these shafts to vary the speed of the output shaft. While a variable pitch-diameter motor pulley drive has been suggested as the means for varying the speed, it is possible to employ other speed-varying means, for example to use stepped pulleys on the motor shaft and input shaft with a belt of constant length embracing these pulleys, and then to obtain the desired speed change by shifting the belt from one step of the pulley to the next, the variation in distance between the axes of the drive and driven shafts making this possible. In a similar way, interchangeable drive gears may be employed and, because of the possibility of changing the distance between the axes of the drive and driven shafts, a substantially infinite variation in speed may thus be obtained.

Fig. 1 is a side elevation of a variable speed-reducing mechanism, embodying the invention and showing the speed-reducing unit mounted upon a stationary supporting base;

Fig. 2 is an end elevation of the device of Fig. 1, showing the parts in full lines in an intermediate speed position and in broken lines in the maximum speed and minimum speed positions;

Fig. 5 is a fragmentary view similar to Fig. 1, but showing the speed-reducing unit suspended from the shaft of a machine which is to be driven and in the maximum speed position;

Fig. 6 is an end elevation of the arrangement shown in Fig. 5;

Figure 7:
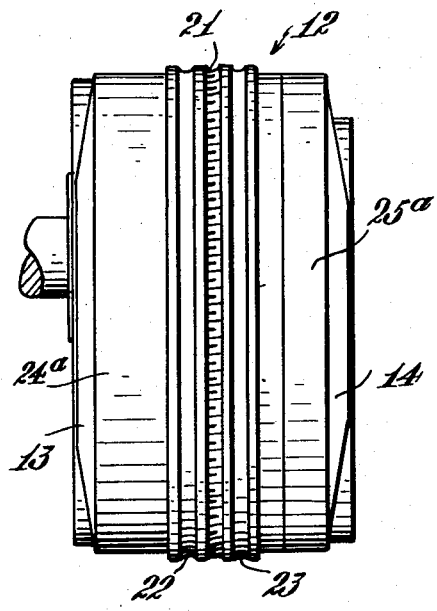
Fig. 7 is a side elevation showing the casing of a speed-reducing unit of the type illustrated in Fig. 1.
Figure 8:
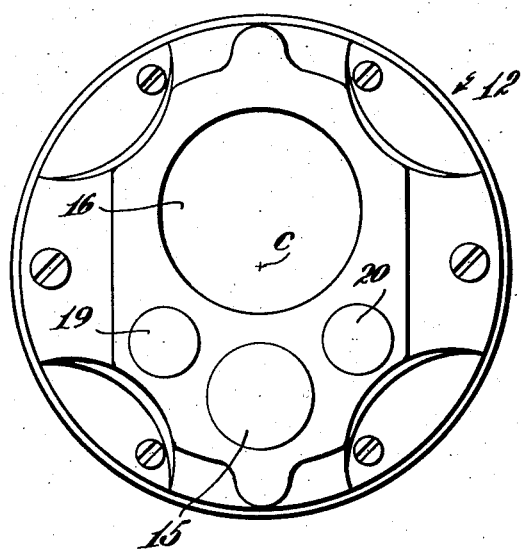
Fig. 8 is an end view of the casing shown in Fig. 7.
Figure 9:
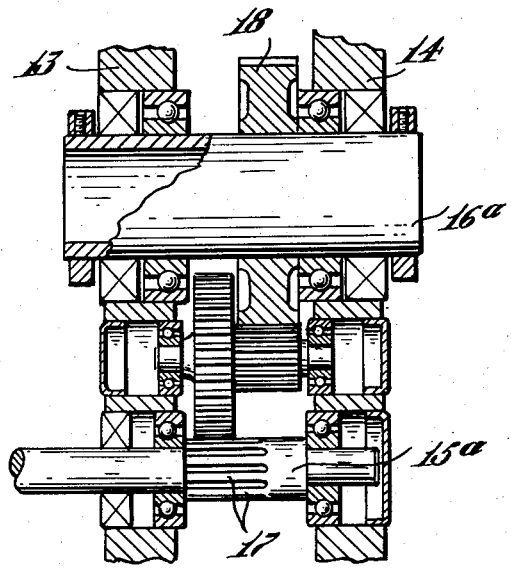
Fig. 9 is a vertical diametrical section through the casing of Fig. 7, but showing the input and delivery shafts and some of the internal gearing installed in the casing.

Referring to the drawings, particularly to Figs. 1 and 2, the numeral 10 designates a base designed to be secured to the floor or other foundation and to provide a suitable support for the speed-varying apparatus of this invention. The base, as here illustrated, comprises the upright portion 11 whose upper surface is downwardly concave to provide a cradle for the reception of the casing 12 of the speed-reducing unit. This speed-reducing unit (Figs. 7, 8 and 9) has a circular casing comprising the assembled end portions 13 and 14 which are connected by bolts or other suitable means, and which have bearing openings 15 and 16 (Fig. 8) for the reception of bearings for the input shaft 15a (Fig. 9) and the delivery shaft 16a, the latter, as shown in Fig. 9, being tubular. The axes of the openings 15 and 16, which receive the bearings for the shafts 15a and 16a (as illustrated in Fig. 8), are in a vertical plane through the axis or center C of the casing 12, this axis or center C being intermediate the axes of the shafts 15a and 16a. The input shaft 15a is provided with a pinion 17 (Fig. 9) and the delivery shaft 16a is provided with a gear 18. The end members 13 and 14 of the casing (Fig. 8) are provided with bearing-receiving openings 19 and 20 for shafts which carry suitable motion-transmitting speed-reducing gearing, by means of which the shaft 16a is driven at reduced speed, as compared with the shaft 15a. The speed-reducing unit, as just above described, is substantially identical with that disclosed in the above-noted Patent No. 2,813,435.

Figure 4:
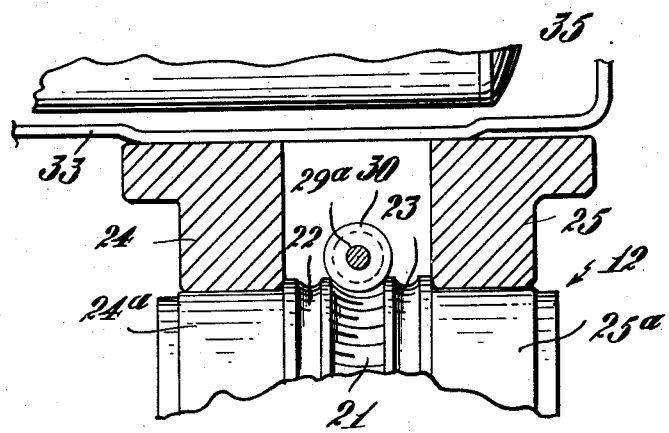
Fig. 4 is a fragmentary vertical section on the line 4—4 of Fig. 3.

At a point substantially midway between the ends of the casing, the peripheral surface of the casing, in accordance with the present invention, is provided with a circumferentially extending series of worm-wheel teeth 21, collectively constituting a worm wheel coaxial with the casing. At each side of this worm wheel, the casing is provided, as illustrated in Figs. 4 and 7 for example, with circumferentially extending grooves 22 and 23, respectively.

Figure 3:
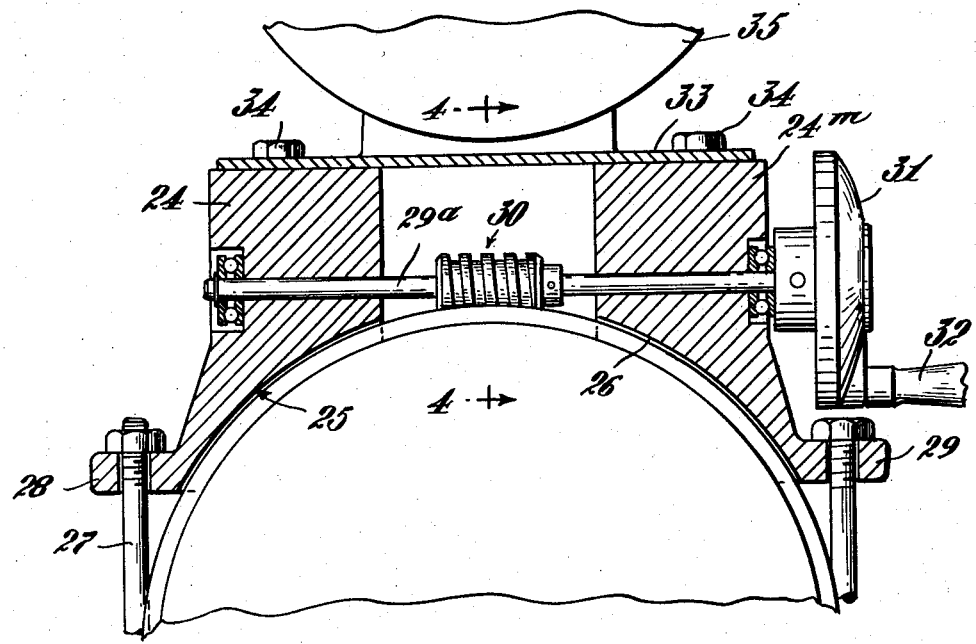
Fig. 3 is a fragmentary vertical section, to larger scale, on the line 3—3 of Fig. 1.

In accordance with the present invention, a motor support S is mounted upon the casing 12, this motor support being here shown as a casting comprising downwardly directed spaced parts 24 and 24m whose lower surfaces 25 and 26, as viewed in Fig. 3, are concave and of arcuate curvature coaxial with the center of the casing 12. These spaced arcuate surfaces 25 and 26 contact cylindrically smooth peripheral surfaces 24a and 25a (Figs. 4 and 7) of the casing outwardly of the grooves 22 and 23, respectively. In order to retain the motor support S in assembled relation with the casing 12, there is provided a yoke device 27, here shown as a U-shaped length of rod, the bend of which is arcuate and of a radius of curvature such that it may be received with a good sliding fit in one or the other of the grooves 22 or 23 of the casing, being here shown (Fig. 5) as seating in the groove 22, and with the opposite ends of the rod secured in openings in ears 28 and 29 integral with the parts 24 and 25, respectively, of the motor support S.

A shaft 29a is mounted to turn in bearings in the parts 24 and 25, respectively of the motor support S and has fixed thereto a worm 30 which meshes with the worm teeth 21 of the casing. This shaft extends outwardly beyond the motor support and is provided at its outer end with a disk 31 from which projects the crank handle 32, by means of which the shaft 29a may be turned manually. By thus turning the shaft 29a, the motor support S may be caused to swing in an arcuate path about the center C of the casing 12, it being noted that the arc along which the motor support thus moves is eccentric with reference to the axis of the input shaft 15a.

A motor bracket 33 (Fig. 3) is mounted on the motor support S, preferably with provision including slots and the bolts 34, whereby this bracket may be moved for adjustment in a direction parallel to the axis of the casing 12. Motor means, for example an electric motor 35, is mounted upon the bracket 33, this motor having a drive shaft 36 (Figs. 1 and 2) which is parallel to the axis of the casing 12, and thus parallel to the axes of the input and delivery shafts 15a and 16a, respectively. Because of the arrangement of the parts as above described, it is evident that if the motor support S be swung about the center or axis C of the casing 12 by the actuation of the handle 32, the distance between the axis of the motor shaft 36 and the axis of the input shaft 15a of the speed reduction unit will change. Because of this fact, it is possible to provide simple means for transmitting motion from the motor shaft to the input shaft 15a such as to vary the speed ratio between the motor shaft and the input shaft. For example, pulleys R and P (Fig. 1) respectively, may be fixed to the motor shaft 36 and to the input shaft 15a, respectively, the pulley R being a variable pitch-diameter pulley of the V type, such as is commonly employed in the well-known Reeves drive, these pulleys being embraced by an endless belt T of constant effective length. With this arrangement, the swinging of the motor support about the center C of the casing 12 will result in changing the speed ratio between the motor shaft and the input shaft. Thus, for example, as illustrated in Fig. 2, with the motor support as shown in the full line position, and assuming a constant motor speed, the input shaft 15a will be driven at an intermediate speed. On the other hand, when the axis of the motor shaft is as indicated at 36a (Fig. 2), the distance between the axis of the motor shaft and the axis of the input shaft 15a is at a minimum and the speed of the input shaft will be at a maximum; while, if the motor support be swung so that the axis of the motor shaft is as shown at 36b (Fig. 2), then the distance between the axis of the motor shaft and the axis of the input shaft 15a is at a maximum and the speed of the input shaft is at a minimum.

Thus, by a very simple construction, and in apparatus which occupies but very little space, it is possible not only to provide for a reduction in speed between the motor shaft and the delivery shaft 16a, but also to provide for a very substantial variation in speed. Although in attaining such variations in speed the drive motor is shifted bodily, it should be noted that the shifting of the motor is of easy accomplishment and, that by reason of the mechanism employed, the motor remains in any position to which it may be adjusted without necessitating the employment of set screws or other locking devices. It is further to be noted that the space occupied by the entire assembly is but little greater, in a horizontal direction, than the space necessary for the accommodation of the reduction unit alone.

In Figs. 5 and 6, the assembled speed reduction unit, motor support and motor is shown as suspended upon the shaft V of the machine M which is to be driven, thus eliminating the base 10. By employing a tubular delivery shaft 16a, as above described, it is readily possible to suspend the entire speed-varying device by slipping the shaft V of the machine which is to be driven into the hollow delivery shaft 16a, with a key or equivalent means for constraining the shaft V to turn with the shaft 16a. When this arrangement is employed, it may be desirable to secure a torque-resisting link or arm L to the casing 12 and to a fixed support, for example the floor, to prevent the speed-varying assembly from turning about the axis of the driven shaft V. In the arrangement shown in Fig. 6, the parts are disposed to provide the lowest speed for the input shaft 15a. In this arrangement, movement of the motor support either to the right or the left of the position shown in Fig. 6 will result in an increase in speed of the shaft 15a.

The same principle of operation may be employed when the motion-transmitting means between the motor shaft and the input shaft 15a is of a type different from, or a modification of the variable speed drive above referred to. Thus, in the arrangement shown in Fig. 10, a further variation in the speed range may be provided by securing a flat face pulley 40 and a V-pulley 40a to the motor shaft 36 and by securing a V-pulley 41 and a flat face pulley 41a to the input shaft 15a. With this arrangement, and by shifting the belt T, which is of constant effective length, from one set of pulleys to the other, the range of speed variation may be increased.

Figures 10, 11:
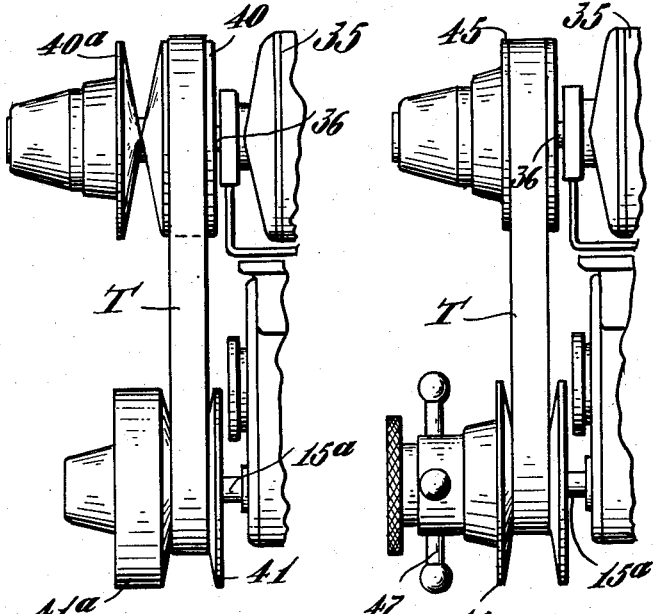
Fig. 10 is a fragmentary side elevation, generally similar to Fig. 1, but showing an arrangement which provides for a greater range of speeds.
Fig. 11 is a view similar to Fig. 10, but showing another means for providing a wide range of speeds.

In Fig. 11, a further modification is illustrated wherein the motor shaft 36 is provided with a flat face pulley 45 and the input shaft 15a is provided with a V-pulley 46, but with the latter pulley designed to be adjusted in diameter by manually actuable means indicated at 47. Thus, in addition to the speed variation resultant from the shift of the motor, a further variation is attainable by manually varying the diameter of the pulley 46.

Figure 12:
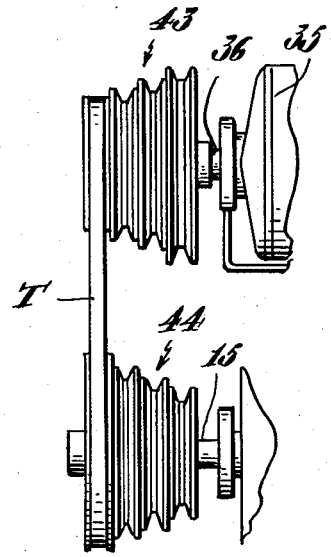
Fig. 12 is a view generally like Fig. 10, but showing the use of stepped pulleys for increasing the speed range.

As illustrated in Fig. 12, a similar increase in speed range may be obtained by providing the motor shaft 36 with a step pulley 43 and by providing the input shaft 15a with a complemental step pulley 44 and using an endless belt T of constant length which may be shifted from one step to another of the respective pulleys. By employing variable pitch-diameter motor pulleys, a wide range of speed variation is provided.

Figure 13:
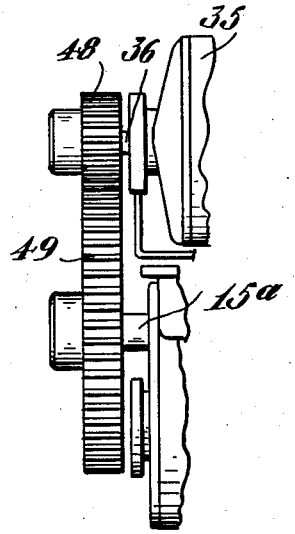
Fig. 13 is a view generally like Fig. 10, but showing the use of interchangeable gears to provide a wide speed range; and, Fig. 14 is a view generally like Fig. 10, but showing the use of a counter-shaft and two sets of pulleys to provide a great range of speed.

In Fig. 13, the motor shaft 36 is shown as provided with a gear 48 and the input shaft 15a is provided with a gear 49, these gears being merely by way of example of a pair of intermeshing gears of any desired pitch ratio. By adjusting the motor support, as above described, it becomes possible, by interchanging gear pairs, to provide an almost infinite variety of speed ratios between the motor shaft and the input shaft.

Figure 14:
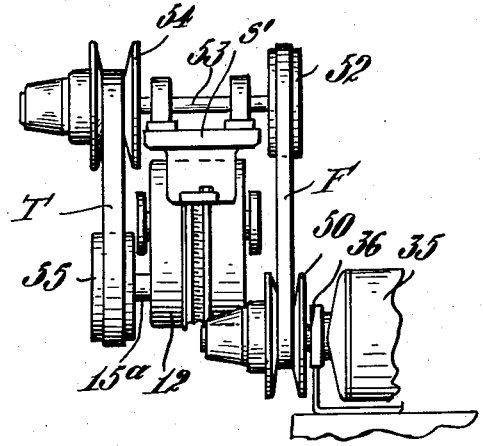

In Fig. 14, a further arrangement is illustrated wherein the motor is mounted on a fixed support and its shaft 36 is provided with a V-pulley 50 which receives an endless belt F which embraces a flat face pulley 52 on a jack or counter-shaft 53, mounted in bearings carried by a rockable support S' which takes the place of the motor support S above described, this support S' being adjustable in an arcuate path about the center of the circular casing of the speed-reducer casing 12 and eccentric to the axis of the motor shaft. The counter-shaft 53 is provided with a V-pulley 54 which is embraced by an endless belt T which drives a pulley 55 on the input shaft 15a of the speed reducer. In this construction, one or both of the belts F or T, with its associated pulleys, may be so designed as to constitute a variable speed drive. With this arrangement, the range of speed variation is greatly extended.

It is to be understood that the arrangements herein specifically disclosed are by way of illustration of useful embodiments of the invention and that all such arrangements and/or modifications thereof which fall within the terms of the appended claims are to be considered as within the purview of the invention.

I claim:

1. In combination in a speed-varying mechanism, a speed-reducing unit comprising a circular casing having bearings for an input shaft and a delivery shaft, the bearings being so located that the axes of the input and delivery shafts are parallel and at diametrically opposite sides of the axis of the casing, gearing housed within the casing for transmitting motion from the input to the delivery shaft, a support for a drive motor mounted slidably to engage the outer curved peripheral surface of the casing and revoluble about the casing in an arcuate path whose center of curvature is at the axis of the casing, a drive motor mounted on the support, the axis of the shaft of the drive motor being parallel to the axis of the casing, variable speed drive means for transmitting motion from the shaft of the drive motor to the input shaft of the speed-reducing unit, said variable speed drive means comprising motion-transmitting elements at least one of which is responsive to variation of the distance between the axes of the motor and input shafts for varying the speed ratio of said shafts, and means for adjusting the position of the motor support along said arcuate path.

2. The combination, according to claim 1, wherein the means for adjusting the motor support comprises a worm wheel co-axial with the casing of the speed-reducing unit, a shaft turning in bearings in the motor support, a worm fixed to the shaft which meshes with the worm wheel, and means for turning the worm shaft.

3. The combination, according to claim 1, wherein the casing is provided with peripheral worm teeth and with a circumferential guide groove, means engaging the guide groove operative to keep the motor support in assembled relation to the casing while permitting the motor support to move along said arcuate path, a shaft turning in bearings carried by the motor support, a worm fixed to the shaft and which meshes with the worm teeth on the casing, and means for turning the worm shaft thereby to move the motor support about the axis of the casing.

4. In combination, in speed-varying mechanism, a motor mounted on a fixed support, said motor having a shaft, a speed-reducing unit having an input shaft and a delivery shaft, a movable support arranged to move in an arcuate path about an axis located between and parallel to the axes of the input and delivery shafts which is eccentric to the motor shaft, a jack-shaft turning in bearings carried by said support, the axis of the jack-shaft being parallel to the axes of the input and delivery shafts, means for adjustably positioning said support along said arcuate path, two pulleys fixed to the jack-shaft, an endless belt embracing one of said pulleys and a pulley fixed to the input shaft and an endless belt embracing the pulley on the motor shaft and the other of the pulleys on the jack-shaft, at least one of the belts and pulleys which it embraces being so constructed and arranged as to constitute a variable speed drive which comprises motion-transmitting elements at least one of which is responsive to variation of the distance between the axes of the shafts supporting the pulleys embraced by said one belt for varying the speed ratio of said shafts.

5. In a drive of the character described, the combination of a speed reducing unit having a circular casing provided with bearings for an input shaft and a delivery shaft, the axes of said shafts being parallel and at diametrically opposite sides of the axis of the circular casing, gearing for transmitting motion from the input shaft to the delivery shaft, a support for a drive motor, said support having a concave arcuate surface concentric with the casing and which contacts the peripheral surface of the casing, means engaging said casing for holding the motor support in assembled relation with the casing while permitting the motor support to move along an arcuate path whose center of curvature is at the axis of the casing, a motor mounted on the support, the motor having a shaft which is always parallel to the axis of the casing, variable speed drive means for transmitting motion from the motor shaft to the input shaft of the speed reducing unit, said variable speed drive means comprising motion-transmitting elements at least one of which is responsive to variation of the distance between the axes of the motor and input shafts for varying the speed ratio of said shafts, and manually actuable means for adjusting the position of the motor support along said arcuate path.

6. A drive, according to claim 5, wherein the casing of the speed reducing unit has at least one peripheral groove, and the means for holding the motor support in assembled relation to the casing, comprises a yoke having an arcuate bend of a radius of curvature such that it seats within said groove with a sliding fit, and means for connecting the opposite ends respectively of the yoke to the motor support.

7. A drive, according to claim 5, wherein the circular casing of the speed reducing unit is provided with a peripheral series of worm teeth, a shaft which turns in bearings carried by the motor support, a worm fixed to said shaft and which meshes with the worm teeth on the casing, and means for turning the worm shaft, thereby to move the motor support along said arcuate path.

8. A drive, according to claim 5, further characterized in having a stationary support provided with a downwardly concave upper surface of a radius of curvature such as to provide a cradle in which the circular casing of the speed reducing unit seats snugly, the motor support being always located above the horizontal plane of the axis of the casing when the casing is so seated.

9. A drive, according to claim 5, further characterized in that the delivery shaft of the speed reducing unit is so assembled with the shaft of apparatus which is to be driven that the entire assembly, comprising the speed reducing unit, the motor support, the motor, and the means for transmitting motion from the motor shaft to the input shaft of the speed reducing unit, is suspended from the shaft of the apparatus which is to be driven.

10. The combination, according to claim 9, further characterized in having means operative to prevent motion of the speed reducing unit, and the parts associated therewith, about the axis of the shaft of the apparatus which is to be driven.

11. In a drive of the character described, the combination of a speed reducing unit having a circular casing provided with bearings for an input shaft and a delivery shaft, the axes of said shafts being parallel and at diametrically opposite sides of the axis of the circular casing, gearing for transmitting motion from the input shaft to the delivery shaft, a support for a drive motor, said support having a concave arcuate surface concentric with the casing and which contacts the peripheral surface of the casing, means engaging said casing for holding the motor support in assembled relation with the casing while permitting the motor support to move along an arcuate path whose center of curvature is at the axis of the casing, and variable speed drive means comprising a pulley on the motor shaft and a pulley on the input shaft of the speed reducing unit, and an endless belt transmitting motion therebetween, at least one of said pulleys being a V-pulley and the belt being of a type such that variation in the distance between the axes of the motor and input shafts results in a variation in the speed ratio of said shafts.

References Cited in the file of this patent

UNITED STATES PATENTS

| | | |
|---|---|---|
| 2,488,871 | Locke | Nov. 22, 1949 |
| 2,497,735 | McCullough | Feb. 14, 1950 |
| 2,543,967 | Heyer | Mar. 6, 1951 |
| 2,797,585 | Bade | July 2, 1957 |

FOREIGN PATENTS

| | | |
|---|---|---|
| 855,507 | France | Feb. 12, 1940 |